(12) United States Patent
Penn et al.

(10) Patent No.: US 7,042,811 B2
(45) Date of Patent: May 9, 2006

(54) FRICTIONLESS, NON-DESTRUCTIVE PLAYBACK SYSTEM FOR CYLINDER RECORDINGS

(75) Inventors: William A. Penn, Baldwinsville, NY (US); Frederick Phelps, Manlius, NY (US)

(73) Assignee: Syracuse University, Syracuse, NY (US)

( * ) Notice: Subject to any disclaimer, the term of this patent is extended or adjusted under 35 U.S.C. 154(b) by 837 days.

(21) Appl. No.: 10/178,308

(22) Filed: Jun. 22, 2002

(65) Prior Publication Data

US 2003/0235122 A1 Dec. 25, 2003

(51) Int. Cl.
*G11B 11/00* (2006.01)

(52) U.S. Cl. ......................................... 369/18; 369/179
(58) Field of Classification Search ................... 369/18, 369/17, 16, 15, 14, 179, 127; 360/87, 100.1
See application file for complete search history.

(56) References Cited

U.S. PATENT DOCUMENTS

| | | | | |
|---|---|---|---|---|
| 3,794,778 A | * | 2/1974 | Smith et al. ................. | 369/179 |
| 3,956,597 A | * | 5/1976 | Carrarini ..................... | 369/23 |
| 4,633,715 A | * | 1/1987 | Monchalin ................... | 73/657 |
| 5,754,517 A | * | 5/1998 | Futagawa .................... | 369/179 |
| 6,185,179 B1 | * | 2/2001 | Mohrin ........................ | 369/127 |

\* cited by examiner

*Primary Examiner*—Tan Dinh
(74) *Attorney, Agent, or Firm*—Christopher R. Pastel; Hancock & Estabrook, LLP

(57) ABSTRACT

The present invention provides a laser heterodyne interferometer based system for audibly producing sounds recorded on a cylinder recording, such as an Edison type wax cylinder, or a 33, 45 or 78 RPM LP (long play) record. The system generally comprises an optical system mounted on an optical platform, and an audio recording medium mounted on a platform operatively positioned relative to the optics platform. The optical system comprises an interferometer type structure that uses laser generated light propagated either through free space or through fiber, a platform on which the optical system is mounted, and a platform on which the recording media (e.g., cylinder or record) is mounted.

9 Claims, 20 Drawing Sheets

0 ORDER = LASER FREQUENCY
1 ORDER = LASER FREQUENCY + 100MHz
-1 ORDER = LASER FREQUENCY - 100MHz

FRICTIONLESS, NON-DESTRUCTIVE PLAYBACK SYSTEM FOR CYLINDER RECORDINGS

STATEMENT AS TO RIGHTS TO INVENTIONS MADE UNDER FEDERALLY SPONSORED RESEARCH AND DEVELOPMENT

The U.S. Government has a paid-up license in this invention and the right under limited circumstances to require the patent owner to license others on reasonable terms as provided for by the terms of Contract Number LL-90163-99 awarded by The Institute of Museum and Library Sciences (IMLS).

BACKGROUND OF THE INVENTION

1. Field of Invention

The present invention relates generally to laser heterodyne interferometers, and more particularly to laser heterodyne interferometers used to produce an audible output or digital representation of an audible output representative of the physical structure formed in the helical groove of a cylinder recording, such as an Edison type wax cylinder or a 33, 45 or 78 RPM long play record.

2. Description of Prior Art

Prior to the advent of magnetic tape and digital technology for storage of sound recordings on a medium, sounds were recorded by carving a helical groove in a material, wherein the groove includes undulating vertical or horizontal "peaks" and "valleys" that modulate the frequency of the sounds they represent. To playback the sounds recorded in the 20 groove, a mechanical stylus is positioned in the groove and the groove is rotated at a predetermined speed, thereby causing the mechanical stylus to traverse the "peaks" and "valleys" at an equal speed. The movement of the stylus within the groove is then transferred to a diaphragm that then vibrates at frequencies equal to the modulations. The pressure created through vibration of the diaphragm creates sound waves varying in pitch and tone with the frequency of the vibrations. The sound waves may then be amplified and output through a speaker.

As electronic technology advanced, the vibrating diaphragm was replaced with a stylus that transferred the modulations in the groove to a Piezo electric element that converted the mechanical energy (pressure) into electrical energy (a voltage proportional to the pressure). The electrical signal could then be conditioned, amplified, and sent through a transducer (for converting the electric energy into acoustic energy) for playback through a speaker.

While the prior art technology for playing back the sounds recorded on cylinders is well accepted, the wear and tear on the recording medium as a consequence of the repeated physical contact between the groove and stylus degrades the quality of the audio signal. It is not uncommon, therefore, for a LP record to playback "pops" and other forms of noise due to the breakdown of the "peaks" and "valleys" carved into the groove. In addition, with the early cylinder recordings that were the prevalent form of recordings from around 1895 until around 1929, the medium in which the groove was cut was made of a wax type substance. The repeated friction between the stylus and the wax breaks down the wax and degrades the quality of the recording. With many of these wax cylinder recordings forming an important part of history, the need exists for a device that can playback the sounds recorded on these cylinders without decaying or further degrading the quality of the sound.

3. Objects and Advantages

It is therefore a principal object and advantage of the present invention to provide a system and device that can play back audibly or digitally copy sounds recorded on a cylinder or grooved medium without degrading the medium on which the recording is stored.

It is a further object and advantage of the present invention to provide a system and device for frictionlessly playing back audibly or digitally copying a sound recorded in a groove formed in a cylinder or other grooved medium.

Other objects and advantages of the present invention will in part be obvious, and in part appear hereinafter.

SUMMARY OF THE INVENTION

In accordance with the foregoing objects and advantages, the present invention provides a laser heterodyne interferometer based system for audibly producing or digitally copying sounds recorded on a cylinder recording, such as an Edison type wax cylinder, or a 33, 45 or 78 RPM LP (long play) record. The system generally comprises an optical system mounted on an optical platform, and an audio recording medium mounted on a platform operatively positioned relative to the optics platform. The optical system comprises an interferometer type structure that uses laser generated light propagated either through free space or through fiber, a platform on which the optical system is mounted, and a platform on which the recording media (e.g., cylinder or record) is mounted. The optical system includes a coherent beam of light either in a free space propagation system or a fiber based interferometer arrangement, such as Mach-Zehnder and Michelson interferometers (or variations thereof). The beam is split into two beams, a reference beam and a signal beam, that are ultimately heterodyned together. In the free space propagating system, the reference beam passes through a frequency shifter, but is otherwise unaffected, while the signal beam passes through various devices for altering its polarization and is focused to reflect off of the groove formed in the recording medium. In the fiber guided systems, the signal beam passes through the frequency shifter and the reference beam is simply transmitted in its originating state. The two beams are recombined in a beam splitter (combiner) and directed to a detector where the phase difference between the two beams is compared and the optical energy is converted into electrical energy. Through the heterodyning process, the phase difference between the two beams is determined to be the frequency modulation provided by the rotating groove of the cylinder that is carried by the signal beam.

Once the optical signal is converted back to electrical energy, the modulated frequency is amplified, demodulated, and played back to a listener or recording device through a conventional FM receiver (which performs a second heterodyning operation on the signal that is an internal feature of the receiver). In other terms, the "beat" between the two beams appears in the detector (which converts light power to electronic current) that varies in synchronism with the phase precession between the two beams.

In use, it is necessary for the coherent signal beam of light to be directed at the center of the groove formed in the cylinder. To accomplish this tracking function, the light reflected from the groove is monitored with two non-coherent detectors positioned to either side of the reflected beam path (i.e., left and right detectors). If the transmitted signal beam arrives to the left of the center of the groove, the reflected beam will move to the right of the beam path, and vice-versa. The two detectors are differentially wired or they are applied to differential ports of an operational amplifier so that the output current is bipolar. Thus, for example, a positive output current represents a tracking error to the left of the groove center, and a tracking error to the right is indicated by a negative output current. Furthermore, this error signal is proportional to a first approximation such that the magnitude of the output current is indicative of the distance the beam deviates from the groove's center. This error signal is then amplified, subjected to stabilization networks, and applied to devices, such as galvanometers and mirrors, which act to restore the signal beam to the center of the groove.

BRIEF DESCRIPTION OF THE DRAWINGS

The present invention will be further appreciated and understood by reading the following Detailed Description in conjunction with the accompanying drawings, in which.

DETAILED DESCRIPTION

Figure 1:
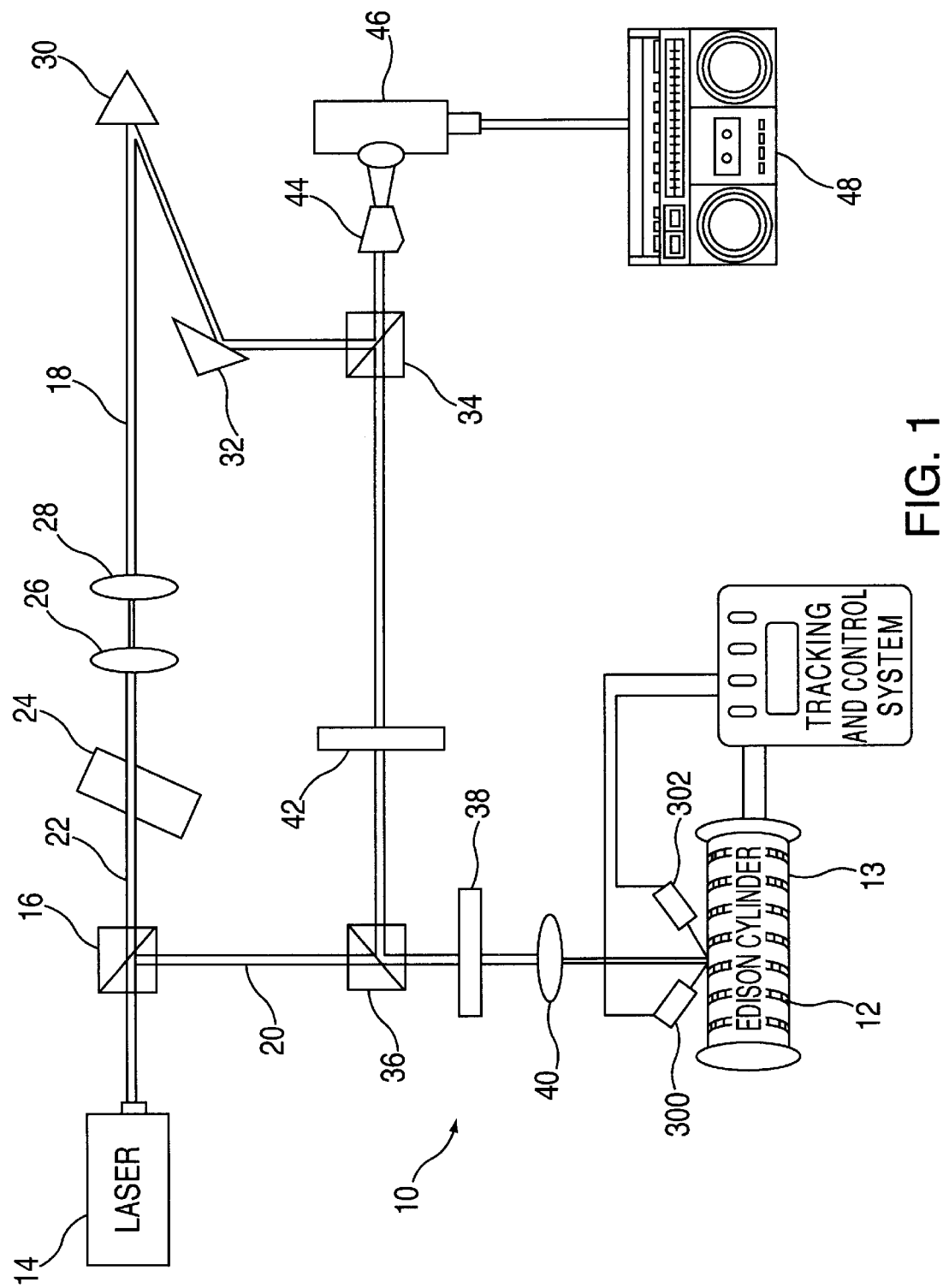
FIG. 1 is a schematic representation of a first embodiment of the present invention, wherein the light is propagated through free space.

Referring now to the drawings, in which like reference numbers refer to like parts throughout, there is seen in FIG. 1 a laser heterodyne interferometer type system, designated generally by reference numeral 10, used for audibly playing back sounds recorded in the helical groove 12 of a medium 13, such as the wax cylinder 13 (or, equivalently, a 33, 45 or 78 RPM LP record).

The optical system illustrated in FIG. 1 uses a coherent beam of light generated by a laser 14, such as a HeNe laser (although any laser that produces short wave lengths would be operable), that propagates freely in space. The beam emanating from laser 14 is directed through a beam splitter 16 that divides the original beam into two separate beams: a reference beam 18 and a signal beam 20. Reference beam 18 travels along a path 22 and passes through a frequency shifter 24, such as an acousto-optical cell, that shifts the frequency of the light by a predetermined amount, such as 100 MHz. After passing through the frequency shifter 24, reference beam 18 passes through a pair of divergence lenses 26, 28 before being reflected by pair of path compensation mirrors 30, 32, which alter the path of reference beam 18 by 90 spatial degrees. Reference beam 18 is then directed to a beam splitter 34 where it is recombined with signal beam 20, as will be explained hereinafter.

Signal beam 20 travels along a transmission path beginning at beam splitter 22 and passes through a polarizing beam splitter 36. Polarizing beam splitter 36 permits total transmission of light having vertical polarization, while light having horizontal polarization is totally reflected, thereby not causing any losses in the set-up of the present invention. After passing through polarizing beam splitter 36, signal beam 20 passes through a ¼ wave plate 38 to convert the vertical polarization to circular. After having its polarization converted to circular, signal beam 20 passes through an objective lens 40 to focus it into groove 12 of cylinder 13.

Signal beam 20 is then reflected off of cylinder 13 and back through objective lens 40 and ¼ wave plate 38 where its polarization is converted from circular to linear (horizontal). The linear polarized signal beam 20 then impinges beam splitter 36 that reflects the beam through a ½ wave plate 42 which converts the linear (horizontal) polarization to vertical polarization. The vertically polarized signal beam 20 is then passed through beam splitter 34 where it is recombined with reference beam 18.

It is important to note that reference beam 18 and signal beam 20 should be recombined in a coherent manner with the wavefronts of the two beams as congruent as possible. Thus, the curvature of reference beam 18 may be adjusted by lenses 26, 28 to match the curvature of signal beam 20, and the angles of the two wavefronts being matched by mirrors and beam splitter tilt adjustments. In theory then, the only difference between the two beams is that the signal beam 20 carries the frequency modulation provided by the rotating recording, and the reference beam 18 carries no such modulation, and also the reference beam optical frequency has been shifted by the frequency shifter 24 (by the acoustic frequency in the cell, i.e., 100 MHz). The two beams then "beat" with each other, drifting into and out of phase at the difference frequency rate, i.e., 100 MHz.

The combined reference beam 18 and signal beam 20 are directed through a microscope objective lens 44 before impinging a detector 46 that converts the optical energy into electrical energy. In detector 46, the "beat" between the two beams appears in the output detector current, which varies in synchronism with the phase precession between the two beams. As a result, the signal modulation of interest is transferred to the intermediate frequency carrier that is of the same frequency as the acoustic carrier in the frequency shifter 24. The desired recorded audio signal is found as frequency modulation of the intermediate carrier.

To recover the signal, detector 46 is amplified and applied to a FM receiver 48, where a second heterodyne process (which is an internal feature of FM receivers) converts the carrier to a second intermediate frequency, i.e., 10.7 MHz. After this conversion, the carrier is applied to a discriminator in the FM receiver 48 that converts the frequency modulation to an audio signal. The audio signal may then be amplified and applied to a speaker so that the signal may be heard or conducted to a digital or other recording mechanism.

Figure 7:
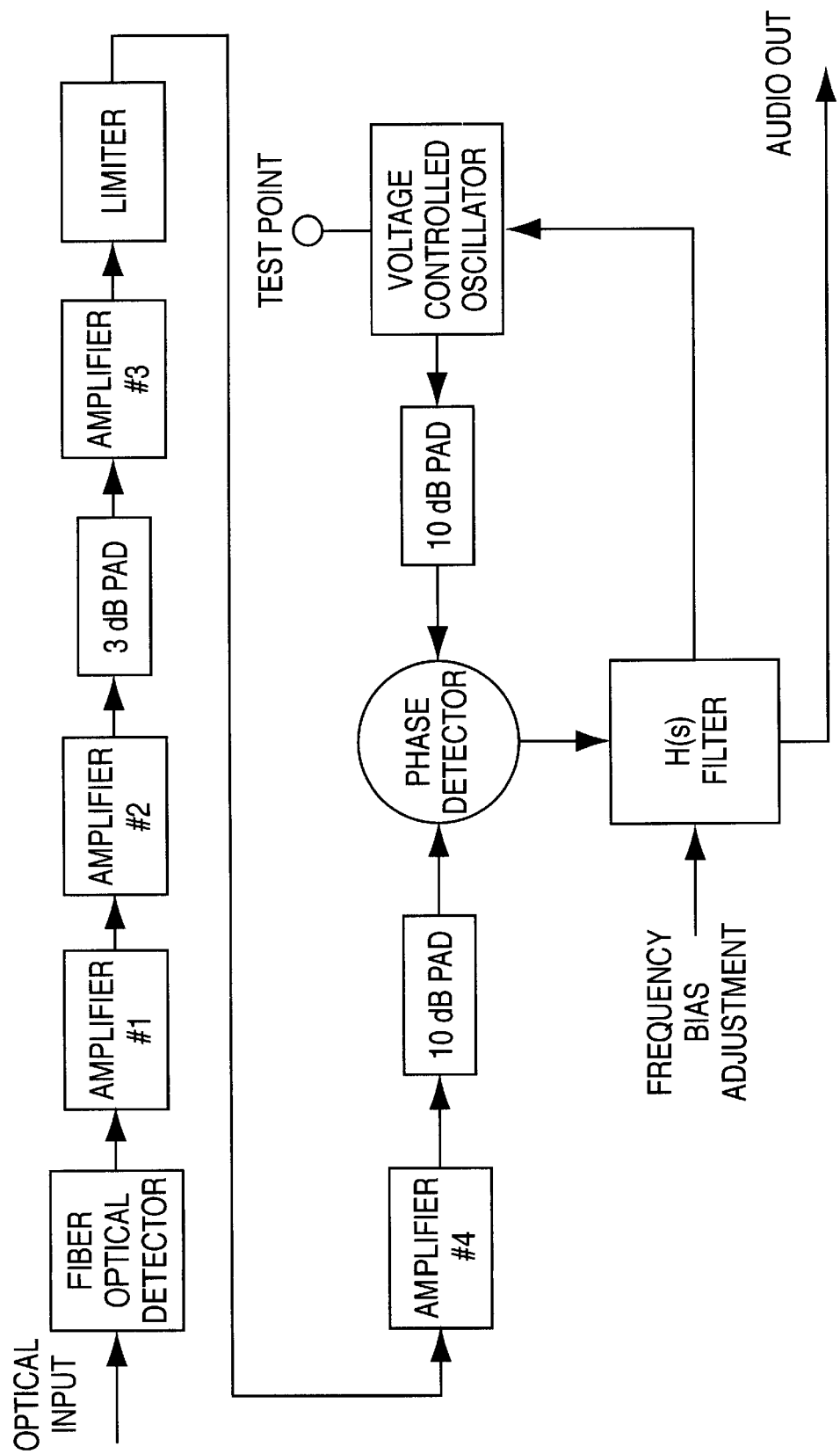
FIG. 7 is a block diagram of a demodulator that may be used in the present invention.

A separate demodulation circuit may also be used. FIG. 7 is an illustrative block diagram of the demodulator.

Figure 2:
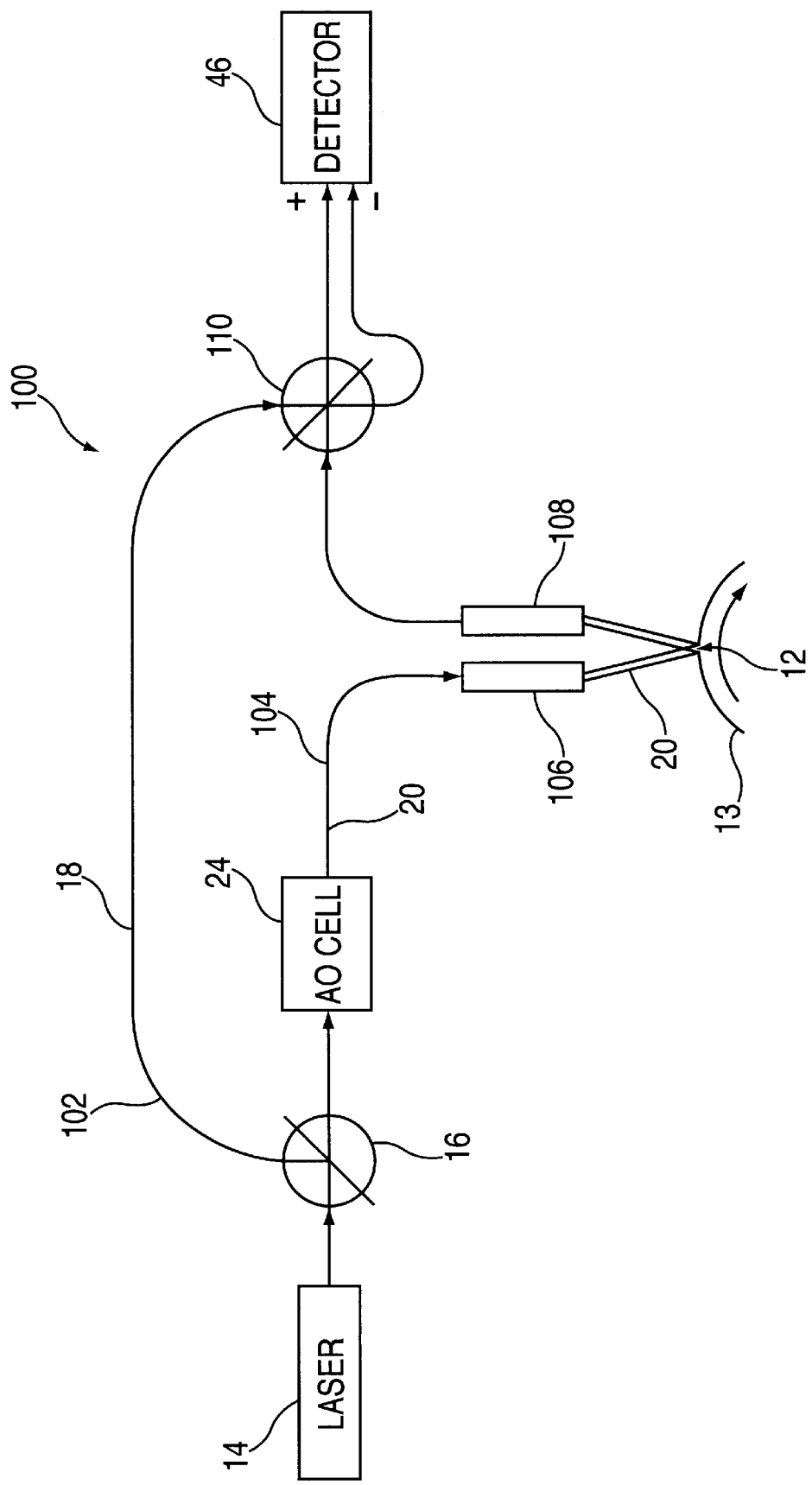
FIG. 2 is a schematic representation of a bistatic fiber guided system that constitutes a second embodiment of the present invention.

Referring now to FIG. 2, a bistatic fiber guided system 100 is schematically illustrated. Identical reference numerals as used in describing elements from the first embodiment will be used to describe elements that are common to this embodiment. After originating in laser 14, the coherent beam of light is split by beam splitter 16 into reference beam 18 and signal beam 20 carried by fibers 102, 104, respectively. After passing through beam splitter 16, signal beam 20 is passed through a frequency shifter 24 (as opposed to reference beam 18 being passed through the frequency shifter in the first embodiment). The shifted frequency carried by signal beam 20 is then passed through a transmitting collimator 106 which focuses the beam of light into the groove 12 of cylinder 13. The light reflected from groove 12 is then collected by receiving collimator 108 and then transmitted to a 4-way beam splitter 110, where it is recombined with reference beam 18 (which was transmitted to beam splitter 110 directly from the beam splitter 16). The recombined signals are then processed through detector 46 in the same manner as was done in the first embodiment.

Figure 3:
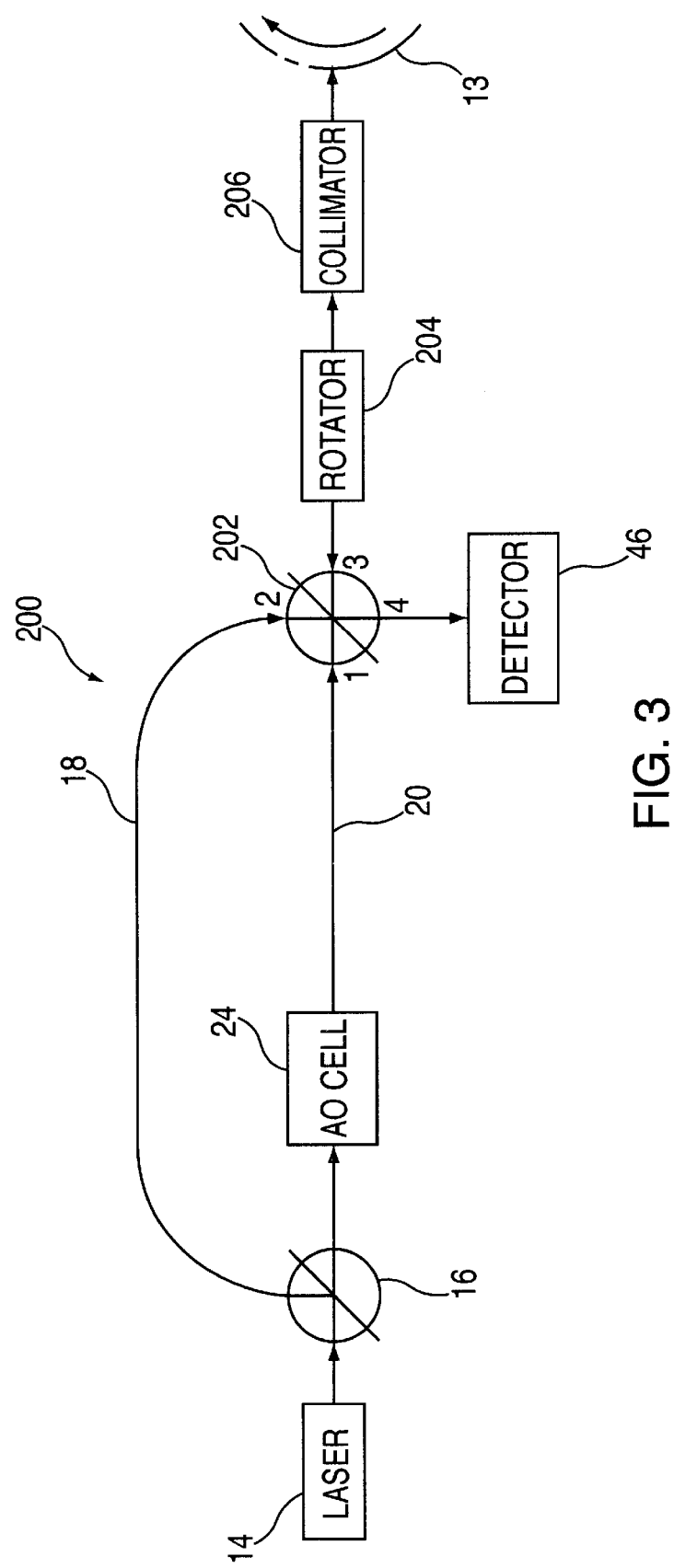
FIG. 3 is a schematic representation of a monostatic fiber guided system that constitutes a third embodiment of the present invention.

Referring to FIG. 3, a monostatic fiber guided system 200 is schematically illustrated. Identical reference numerals used in describing elements from the first embodiment will be used to describe elements that are common to this embodiment. After originating in laser 14, the coherent beam is passed through beam splitter 16 to form reference beam 18 and signal beam 20. Signal beam 20 is then passed through frequency shifter 24 before continuing on to a 4-way beam splitter 202. Due to the linear (vertical) polarity of signal beam 20 as it comes from frequency shifter 24, it is totally transmitted through 4-way beam splitter 202 where it is then transmitted through a polarization rotator 204 (e.g., ¼ wave plate or Faraday device) to change its polarity to circular. The circular polarization of signal beam 20 is then passed through a collimator 206 and is focused into a groove 12 of cylinder 13. Groove 12 then reflects signal beam 20 back through collimator 206 that then directs the beam back through rotator 204 that converts the circular polarity back to linear (horizontal due to the reverse in direction of the beam). From rotator 204, the linearly polarized signal beam 20 is recombined with reference beam 18 and reflected by beam splitter 202 towards detector 46. Detector 46 processes the signals in the same manner as was described relative to the first embodiment.

Relative to the fiber guided systems, it is still important that the optical paths of reference beam 18 and signal beam 20 be matched in length for optimum performance. Thus, the optical "pigtails" that are attached to the various devices must be cut to lengths that will provide this requirement, or a "patchcord" of the proper length must be inserted in the shorter leg to provide matching.

It is a characteristic of optical fibers that mechanical disturbance, or temperature changes can alter the polarization of light exiting a length of fiber as compared to the polarization of the light incident on the input end of the fiber. The polarizations of the signal and reference beams, as they arrive at the detector 46, must be aligned for optimum performance. The unpredictability of the polarizations can be removed by using polarization-maintaining fiber (PM fiber). PM fiber is manufactured with birefringent characteristics that cause light aligned with a birefringent preferred axis at the input point to remain aligned with the axis during the process of propagation through the fiber. The output polarization then becomes predictable and polarization matching can be assured.

Figure 6:
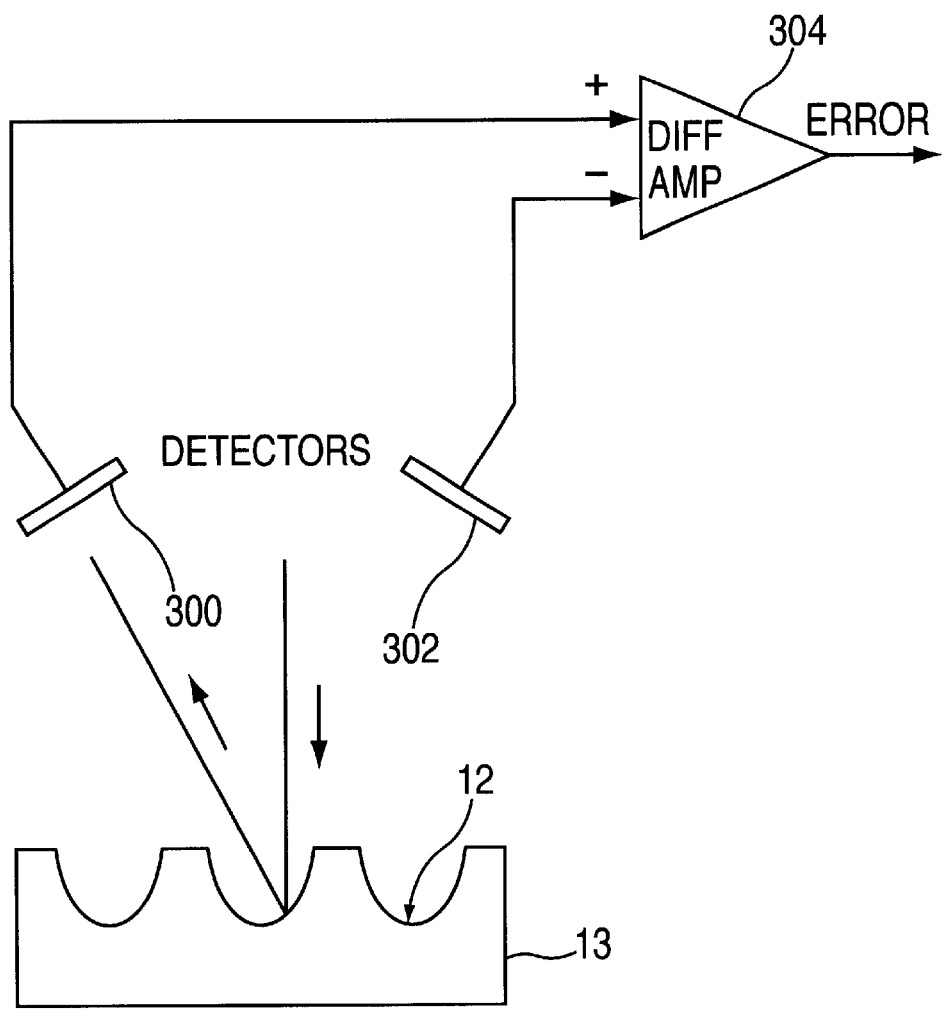
FIG. 6 is a schematic representation of the beam center tracking device of the first embodiment of the present invention.
Figure 6:
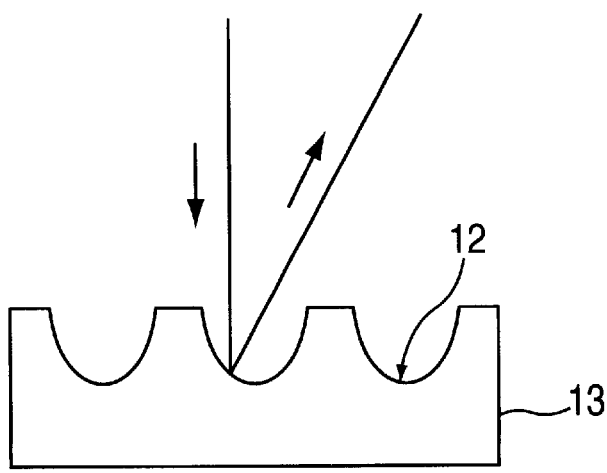

In use, it is necessary for the coherent signal beam 20 to be directed at the center of the groove 12 formed in the cylinder 13 (see FIG. 6). To accomplish this tracking function, the light reflected from the groove 12 is monitored with two non-coherent detectors 300, 302 positioned to either side of the reflected beam path (i.e., left and right detectors). If the transmitted signal beam arrives to the left of the center of the groove 12, the reflected beam will move to the right of the beam path, and vice-versa. The two detectors 300, 302 are differentially wired or they are applied to differential ports of an operational amplifier 304 so that the output current is bipolar. Thus, for example, a positive output current represents a tracking error to the left of the groove center, and a tracking error to the right is indicated by a negative output current. Furthermore, this error signal is proportional to a first approximation such that the magnitude of the output current is indicative of the distance the beam deviates from the groove's center. This error signal is then amplified, subjected to stabilization networks, and applied to devices, such as galvanometers and mirrors, which act to restore the signal beam to the center of the groove.

Figure 4:
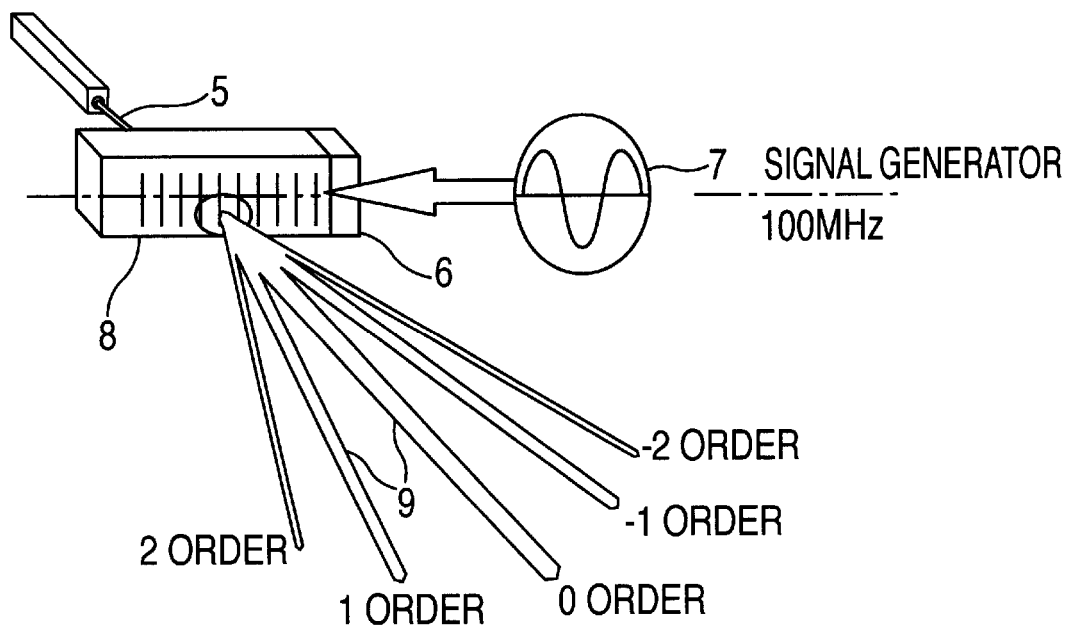
FIG. 4 is a schematic representation of an acousto-optic cell.
Figure 5:
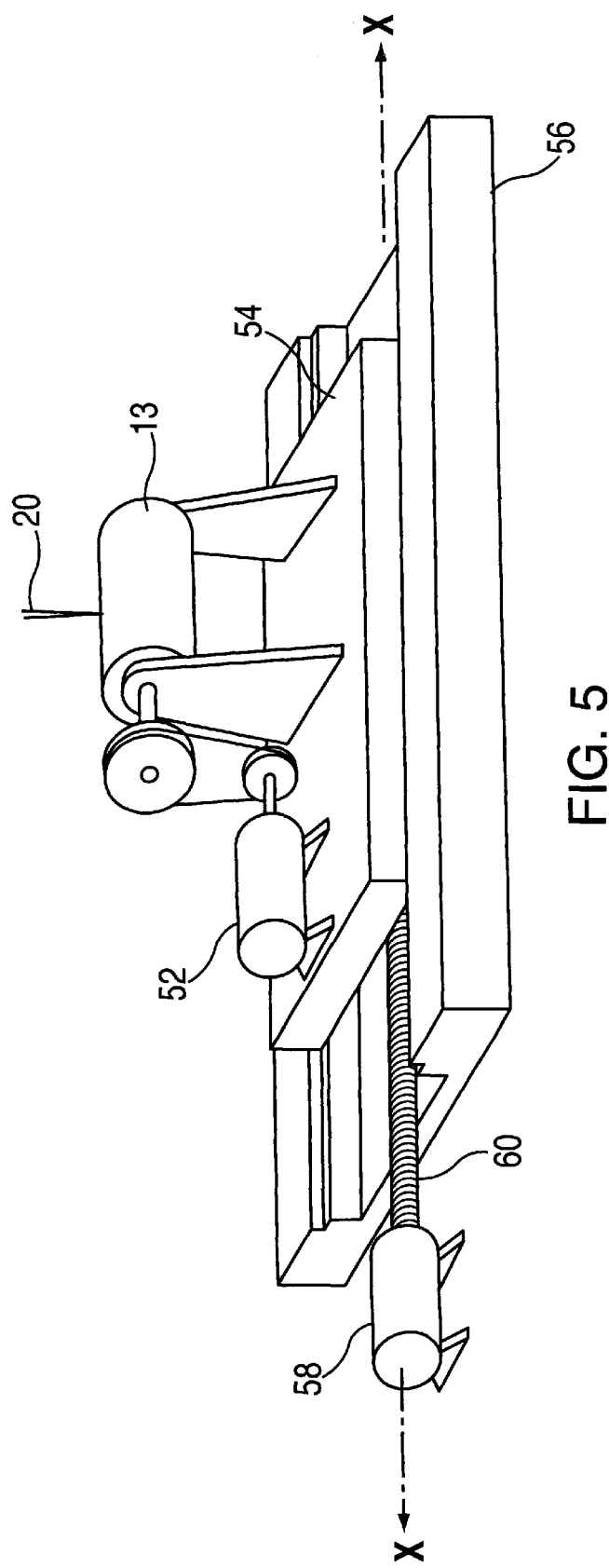
FIG. 5 is perspective view of the cylinder platform of the present invention.

In the free space propagation system 10, the player 52 for cylinder 13 is mounted on a platform 54 that is slidably mounted on a carriage 56, as illustrated in FIG. 4. A carriage motion drive motor 58 receives feed-back from the detectors 300, 302, and drives a lead screw 60 that slides platform 52 along axis X—X to adjust the position of cylinder 13 relative to the signal beam 20.

As with the free space propagating system 10, the fiber guided systems 200 and 300 also require the tracking system to keep the focused laser beam directed into the center of the groove 12 of the rotating cylinder 13. The analysis of the tracking system is largely centered on a mechanism that controls the angle of the final small mirror that directs the beam as it focuses in the groove, namely a galvanometer. It is essentially a very small electromagnetic motor, and the tracking mirror is mounted on the output shaft of this motor. One significant difference between this and a conventional motor is that the galvanometer has an internal rotary spring that restores the position of the mirror to a reference angle when there is no input electric excitation. (note; piezo-ceramic positioners are used for this type of thing too and have similar or better performance)

An approximate tolerance that the focused beam will be within ⅟30 of a groove width during a normal tracking situation is acceptable. Control theory suggests that this requires an "open loop gain" of the control loop of 30. This is based on the assumption that the input wobble, which is one of the primary perturbations that need to be tracked, will be on the order of a groove width or less.

Figure 8:
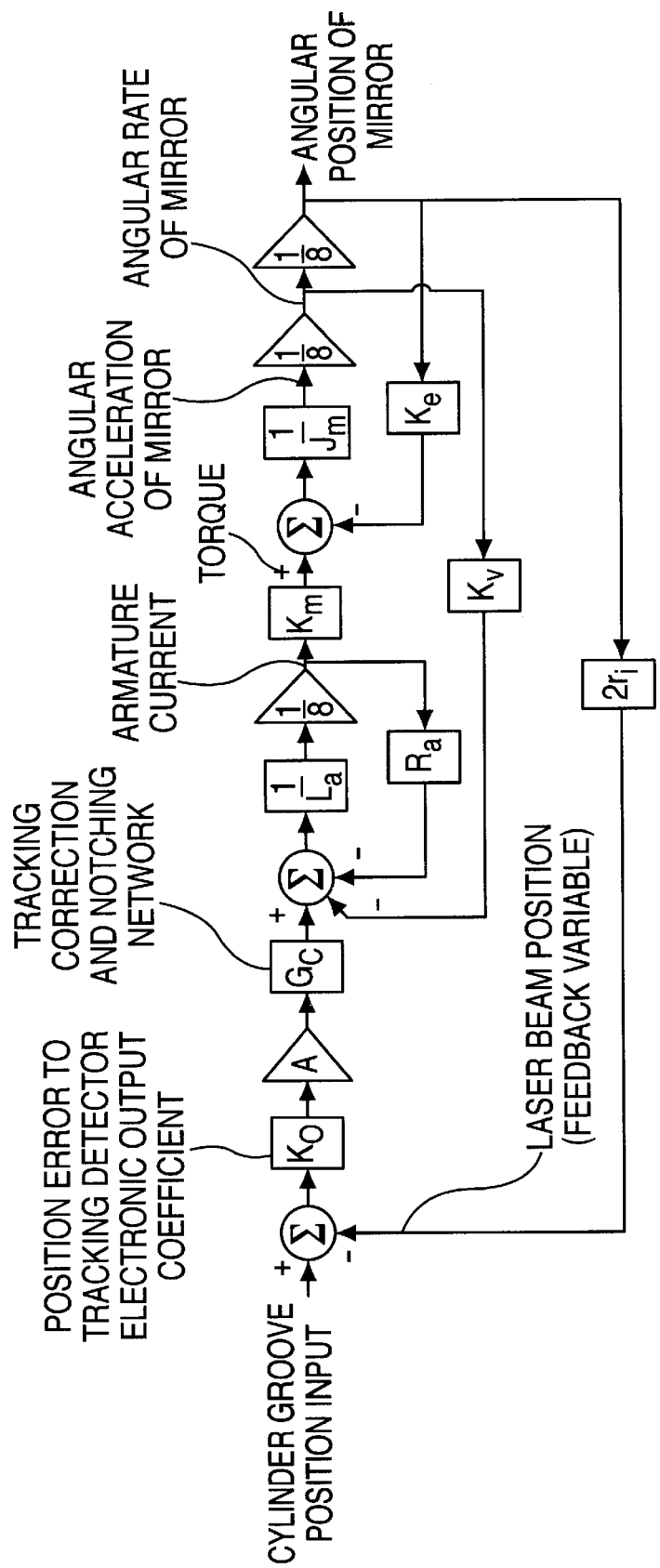
FIG. 8 is a block diagram of the mathematical model of the tracking system used in the second and third embodiments of the present invention.

In FIG. 8 a block diagram of a mathematical model of the tracking system is illustrated. Most of the diagram is a model of the galvanometer, but the elements of the rest of the tracking loop are also shown. The entire transfer function that relates the differential electronic signal provided by the two ancillary tracking detectors 300, 302 to the position of the mirror is linearized and accounted for by a simple coefficient $K_O$.

The important parameters and most particularly those of the galvanometer are listed:

| | | |
|---|---|---|
| $J_m$ | = | moment of inertia of galvanometer motor armature plus the mounted mirror |
| | = | $0.089 \times 10^{-7}$ pound-inches-second$^2$ |
| $K_c$ | = | the mechanical angular stiffness of the galvanometer rotor rotation spring |
| | = | 0.11 pound-inches/radian |
| $R_a$ | = | motor electrical resistance |
| | = | 7 ohms |
| $L_a$ | = | motor electrical inductance |
| | = | 5 milli-henries |
| | | galvanometer motor back electro-magnetic voltage constant |
| | = | $0.23 \times 10^{-3}$ volts/(degrees per second) |
| | = | $0.23 \times 10^{-3} \times 180/\pi = 13.18 \times 10^{-3}$ volts (radian per second) |
| $K_m$ | = | galvanometer motor torque constant |
| | = | $7.8 \times 10^{-3}$ inch-pounds/ampere |

The sequence of events in this control system are as follows: The laser beam, situated in some arbitrary position in the cylinder groove 12, causes stronger reflection into one tracking detector 300, 302 than the other. The differential current output then indicates the tracking error as a bipolar current, the value of which is proportional to the position error of the laser beam. This is converted to a voltage and amplified by an operational amplifier stage. The amplified voltage is applied to the armature of the galvanometer, which causes an armature current. The behavior of the current is governed by the resistance and inductance of the armature electrical windings. A motor torque is thus developed, proportional to the armature current, and this causes rotary acceleration of the motor armature and the attached mirror. This response is governed by the motor armature moment if inertia and the spring stiffness. In the model the rotary acceleration is integrated twice to produce the value of the mirror angle. This is scaled to a beam position by the radial distance from mirror to rotating cylinder. This completes the control loop. Also modeled is the effect of "back (emf) voltage" of the galvanometer motor (this effect being the generator action of the motor when in motion).

The transfer function of the system, or any part of this transfer function, can be evaluated from the model illustrated in FIG. 8 by multiplying and adding variables as indicated in the diagram. If that part of the diagram is evaluated that starts with the voltage output of "Gc" that is applied to the second summer and goes to the output point labeled "angular position of the mirror", the following transfer functions can be evaluated:

$$\frac{0_{out}}{V_{in}} = \frac{\frac{K_m}{L_a J_m}}{s^3 + \left(\frac{R_a}{L_a}\right)s^2 + \left(\frac{K_e L_a + K_v K_m}{L_a J_m}\right)s + \left(\frac{R_a K_e}{L_a J_m}\right)}$$

Substituting the numerical values listed in the table, one obtains the specific transfer function:

$$\frac{0_{out}}{V_{in}} = \frac{1.7528 \times 10^8}{s^3 + 1.4 \times 10^3 s^2 + 1.467 \times 10^7 s + 1.73 \times 10^{10}}$$

In the following pages a MATLAB design/analysis program is listed. The program permits one to experiment with the adjustable/variable parameters of the system, and incorporate notching and correction networks thereto. The first section of the program (about 50 lines of code) evaluates the above numerical version of the galvanometer model, plots the response of the device in terms of shaft angle for a voltage step input to the armature, and also plots the frequency response of the device.

The second section of the program (38 lines of code) analyzes a galvanometer resonance correction circuit ("notch" circuit), folds this into the transfer function, and closes the out loop by connecting the variable representing the laser beam position back to the comparator for which the other input is the cylinder groove position. It then plots the response to an input step of groove position, and plots the frequency response of both the open and closed loop system.

Finally, the third section of the program (41 lines of code) analyzes a correction network using two leading break frequencies and two lagging break frequencies. It folds this network into the transfer function also. It then plots as before the step response and the open and closed loop frequency responses.

Figure 9:
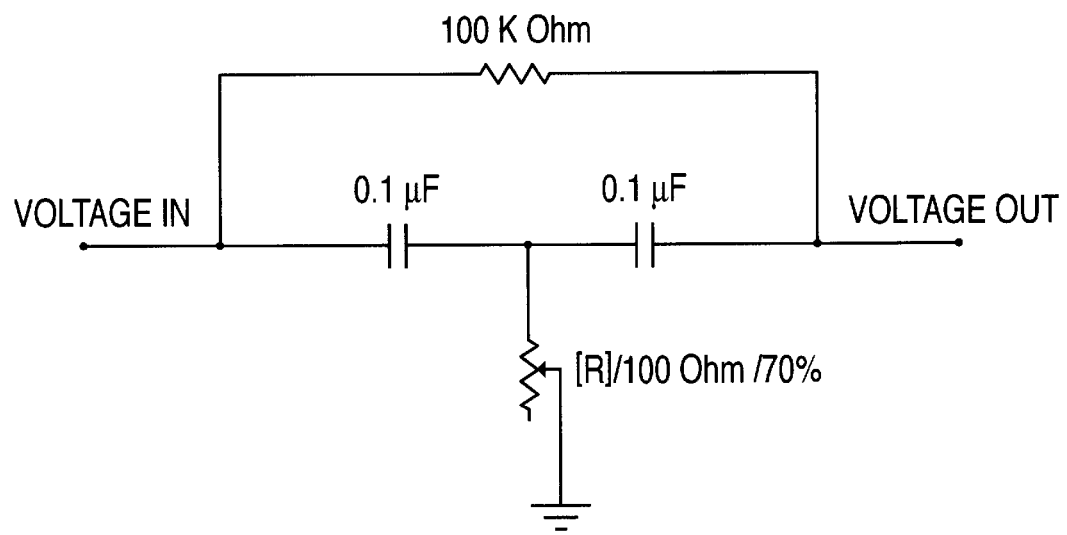
FIG. 9 is a diagram of the bridged T notch filter circuit.
Figure 10:
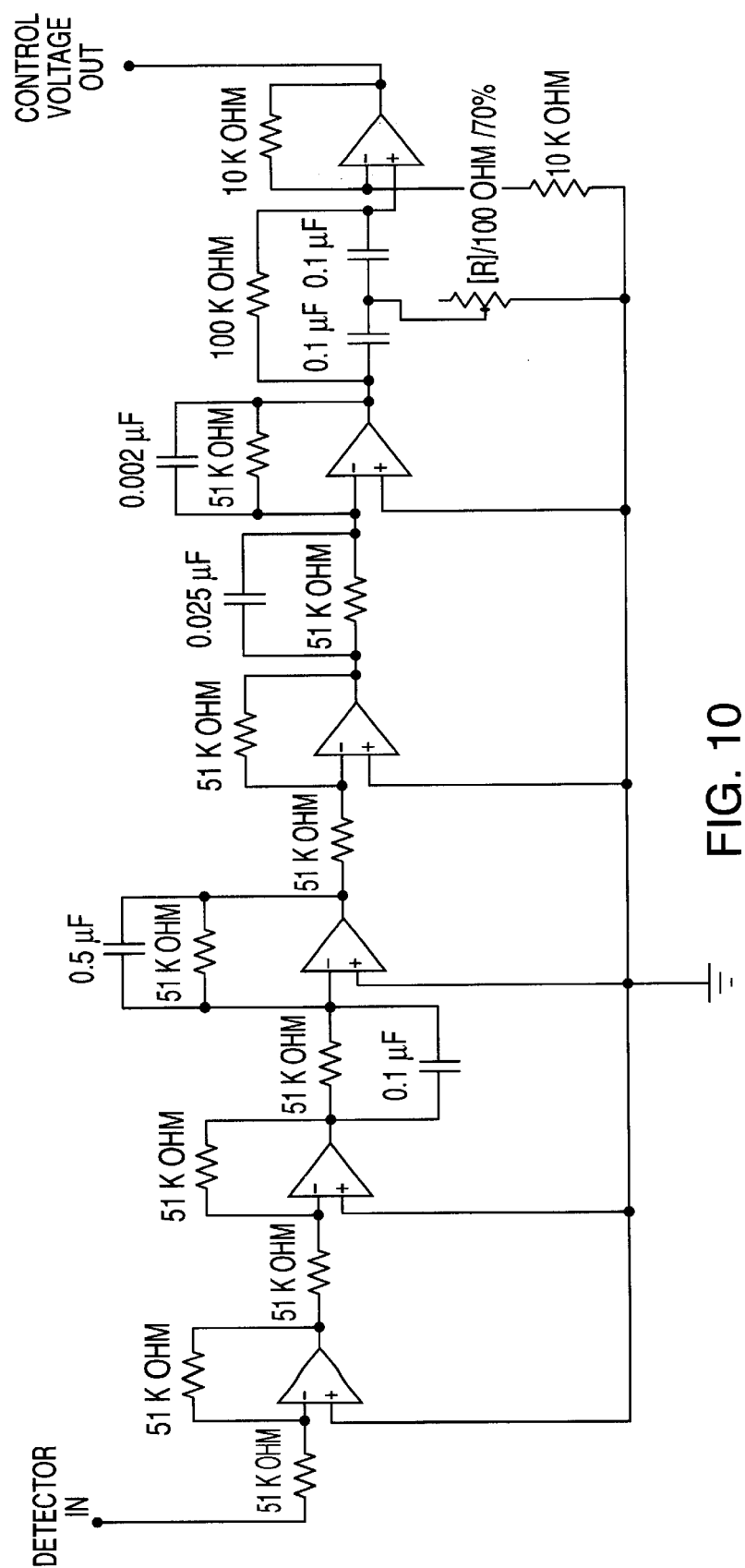
FIG. 10 is a circuit diagram of a correction circuit, including the notch filter.

The circuit that has been used for the notch filter is usually referred to as a "bridged-T network". A circuit diagram of this circuit is shown in FIG. 9. A diagram of the complete correction circuit, which includes the notch filter is shown in FIG. 10. It should be noted that the only really sensitive adjustment in the circuit is the variable 100 ohm resistor which is part of the input circuit to the last stage. This adjustment establishes the anti-resonant point of the filter, which should be placed accurately at the same frequency as the resonance of the galvanometer, the value of which (in the preferred embodiment) is about 605 Hz. Not shown in the circuit diagram is a final power amplifier stage that uses a TI OPA 548 power operational amplifier integrated circuit.

The "pre-calculated values" presently stored in the program are, it is believed, the most accurate set of parameter values that are available, and the parameters stored for the correction network are those that were arrived at by many trial runs of the program.

Figure 11:
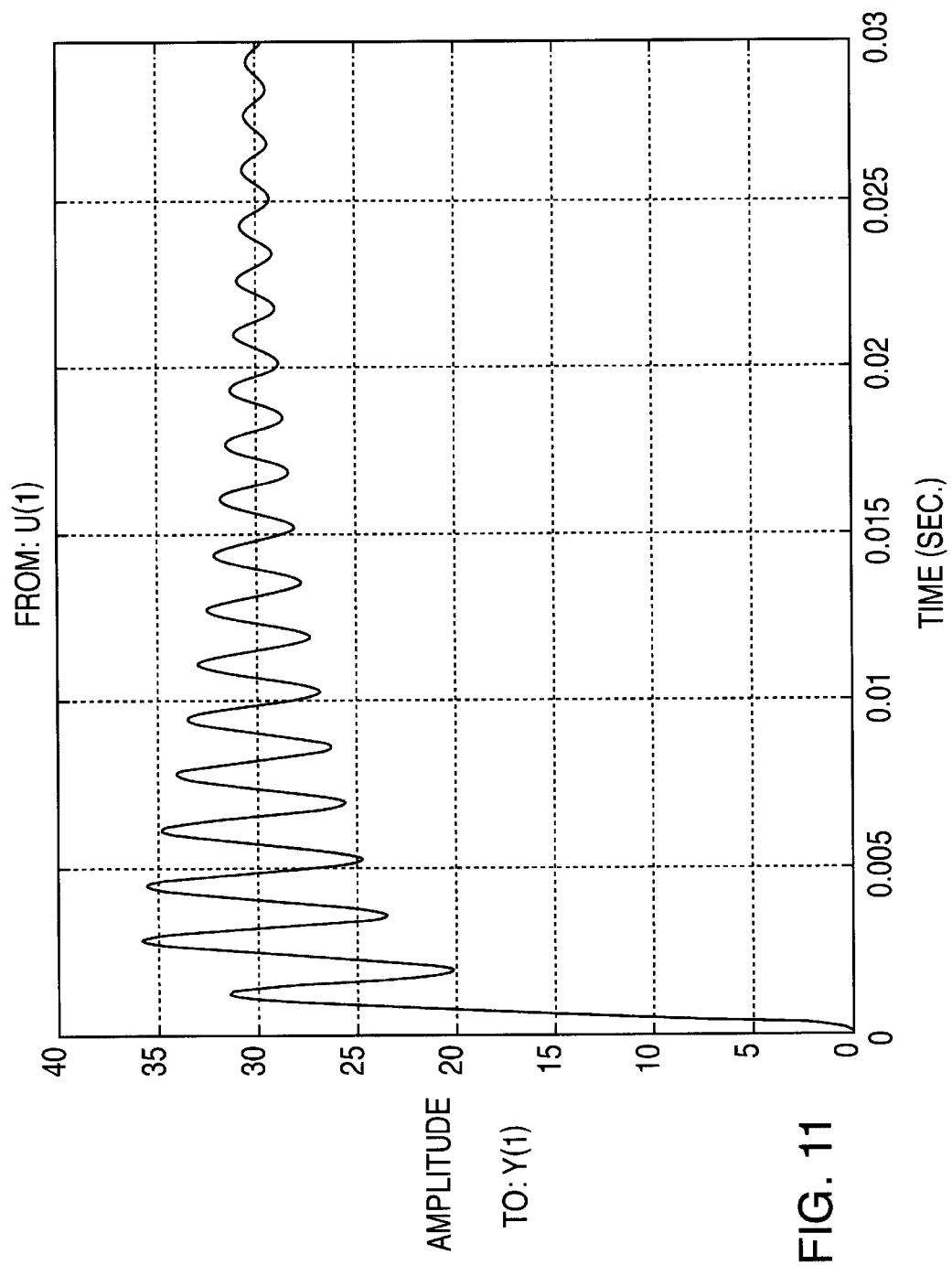
FIG. 11 is a graph of the time step response of uncompensated open loop system.
Figure 12:
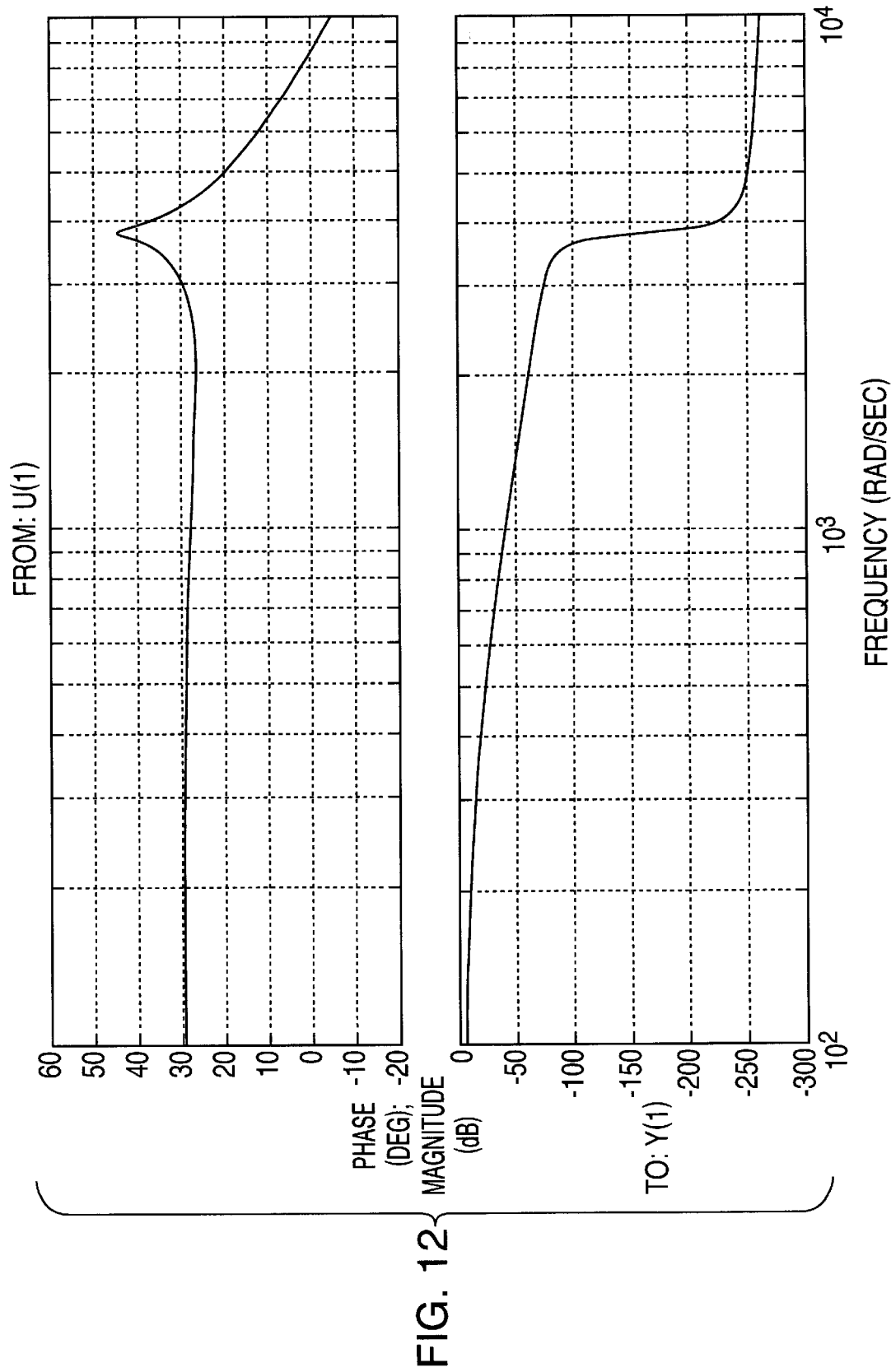
FIG. 12 is a graph of the frequency response of uncompensated open loop system.

We now refer to the output plots that result from running the program. FIG. 11 shows a time plot of the galvanometer response to a voltage step function. The sharp resonance at approximately 600 Hz is clearly evident. FIG. 12 is a frequency spectrum of the galvanometer transfer function again showing a clear 600 Hz resonance. It should be noted that the frequency scale on these frequency plots are in radians/second, instead of hertz. Thus the frequency numbers must be divided by $2\pi$ to obtain the value in Hz. Reading a value of about 3800 from this graph is seen to correspond well with $3800/2\pi=605$ Hz.

Figure 13:
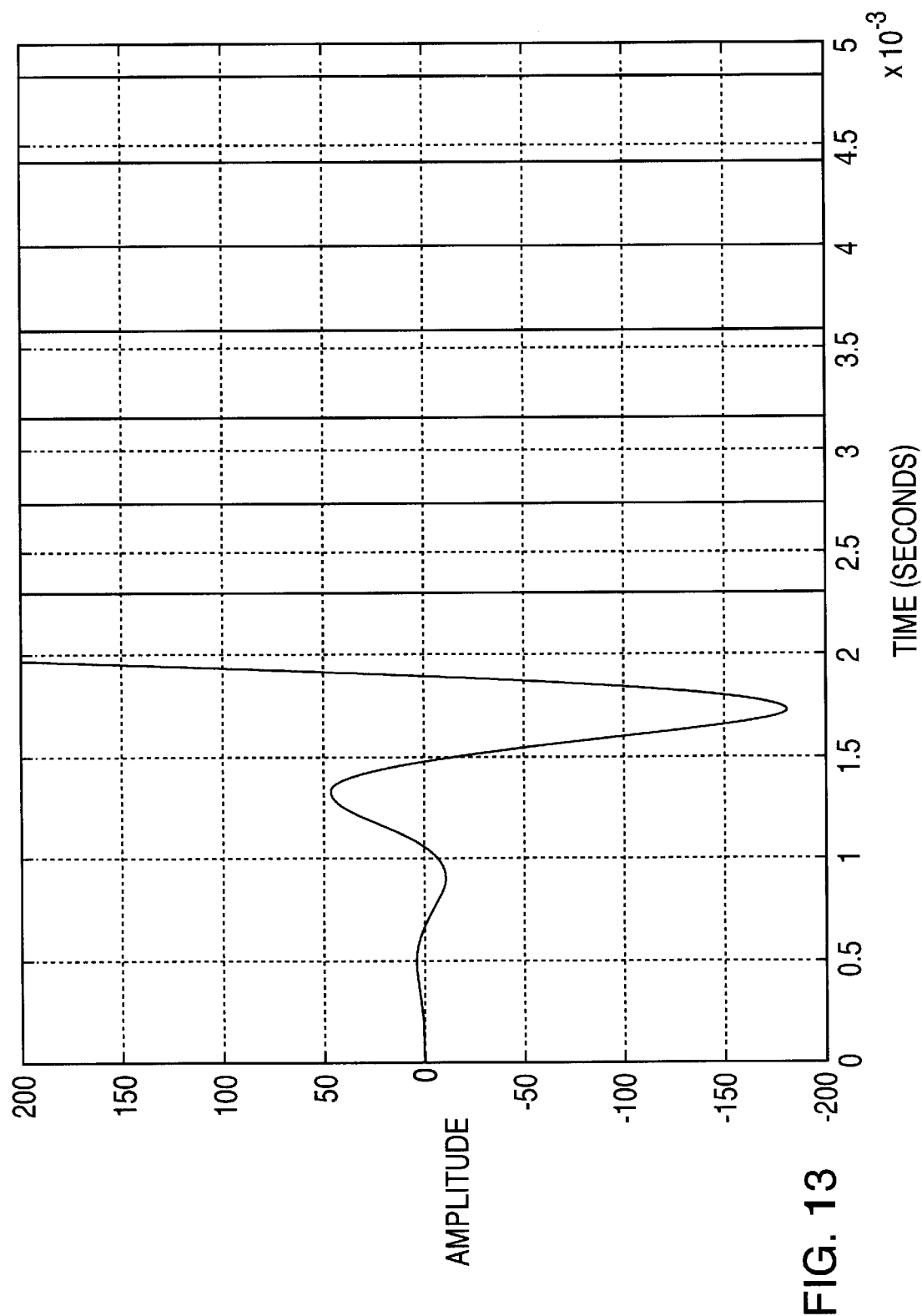
FIG. 13 is a graph of a step response of un-notched and uncompensated system.

FIG. 13 results from a closed loop calculation, with the loop gain applied to provide a fractional error of $\frac{1}{30}$. At this loop gain, the system is clearly very unstable.

Figure 14:
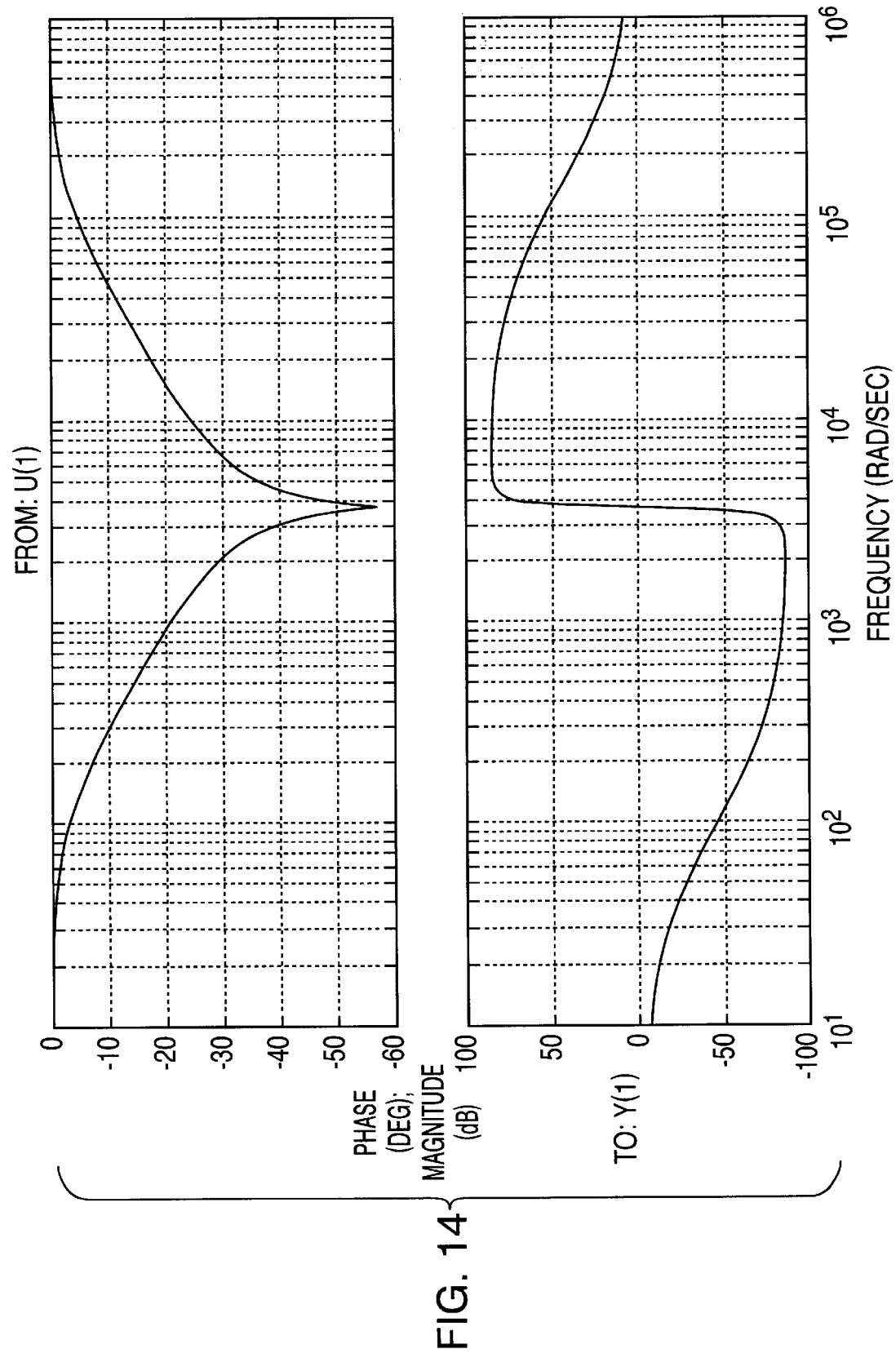
FIG. 14 is a graph of frequency response of notch filter.

FIG. 14 is a frequency plot of the notch filter, with its anti-resonance placed to correspond to the 605 Hz galvanometer resonance.

Figure 15:
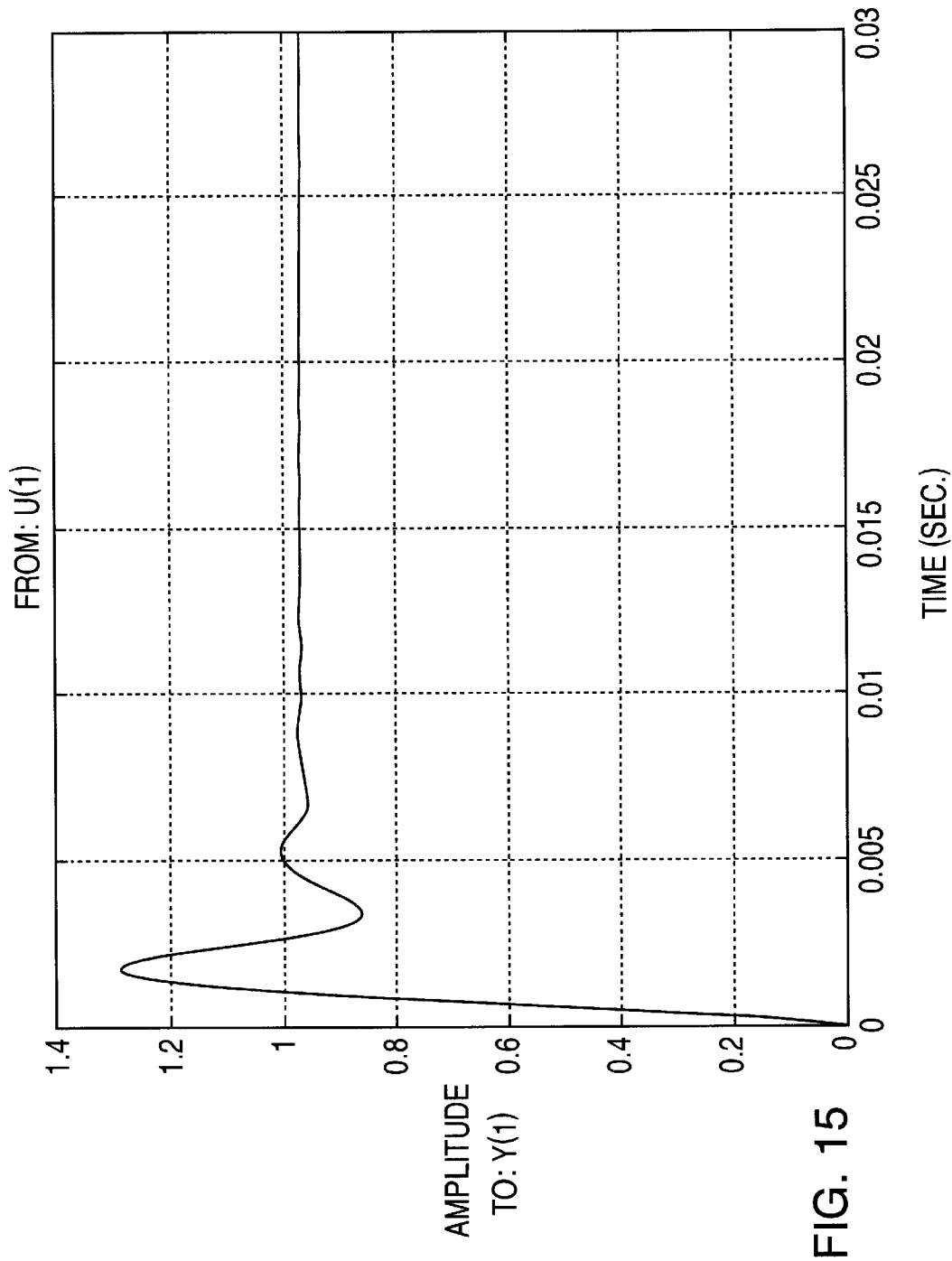
FIG. 15 is a graph of time step response of notched closed loop system.
Figure 16:
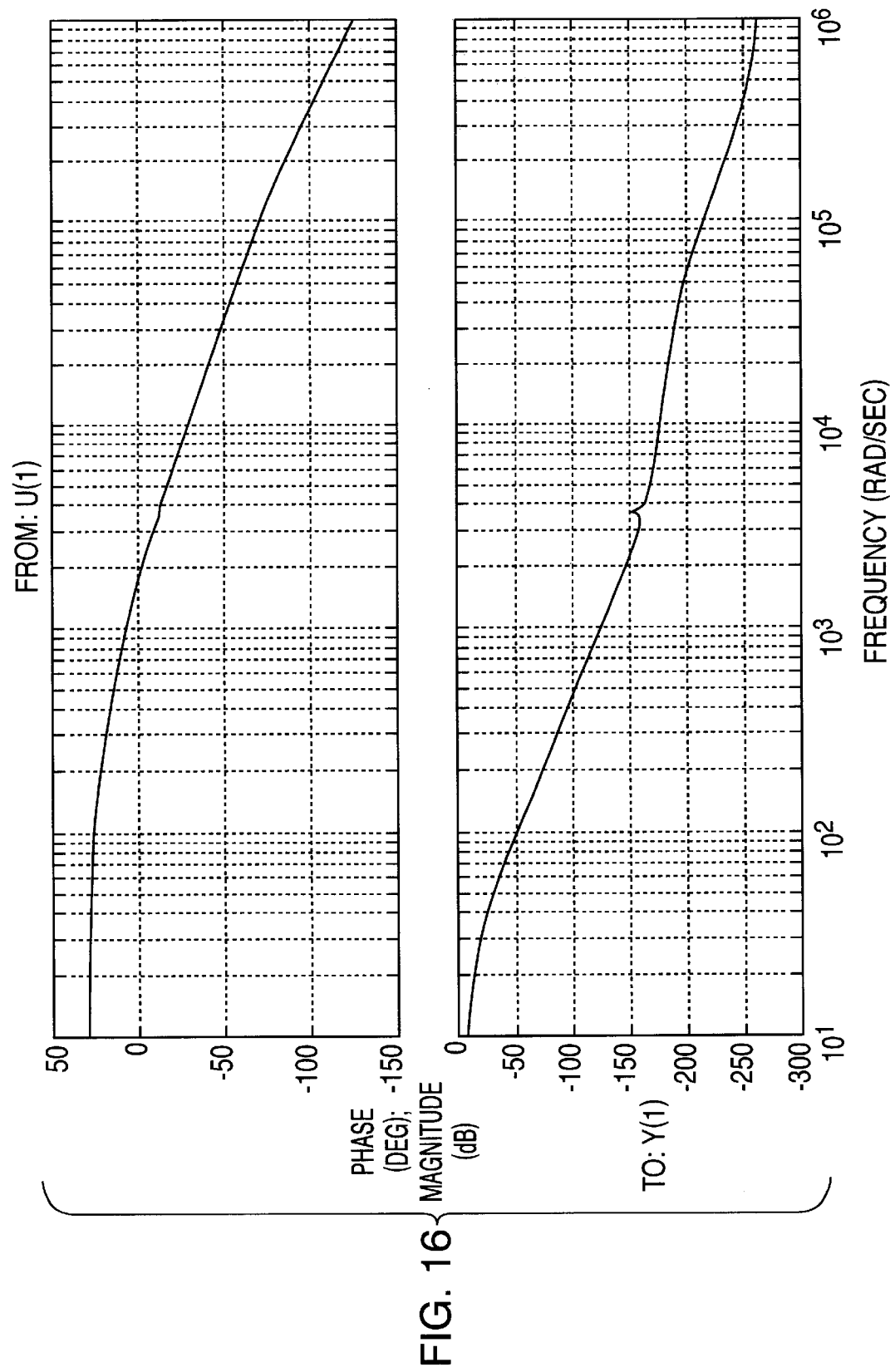
FIG. 16 is a graph of frequency response of notched open loop system.
Figure 17:
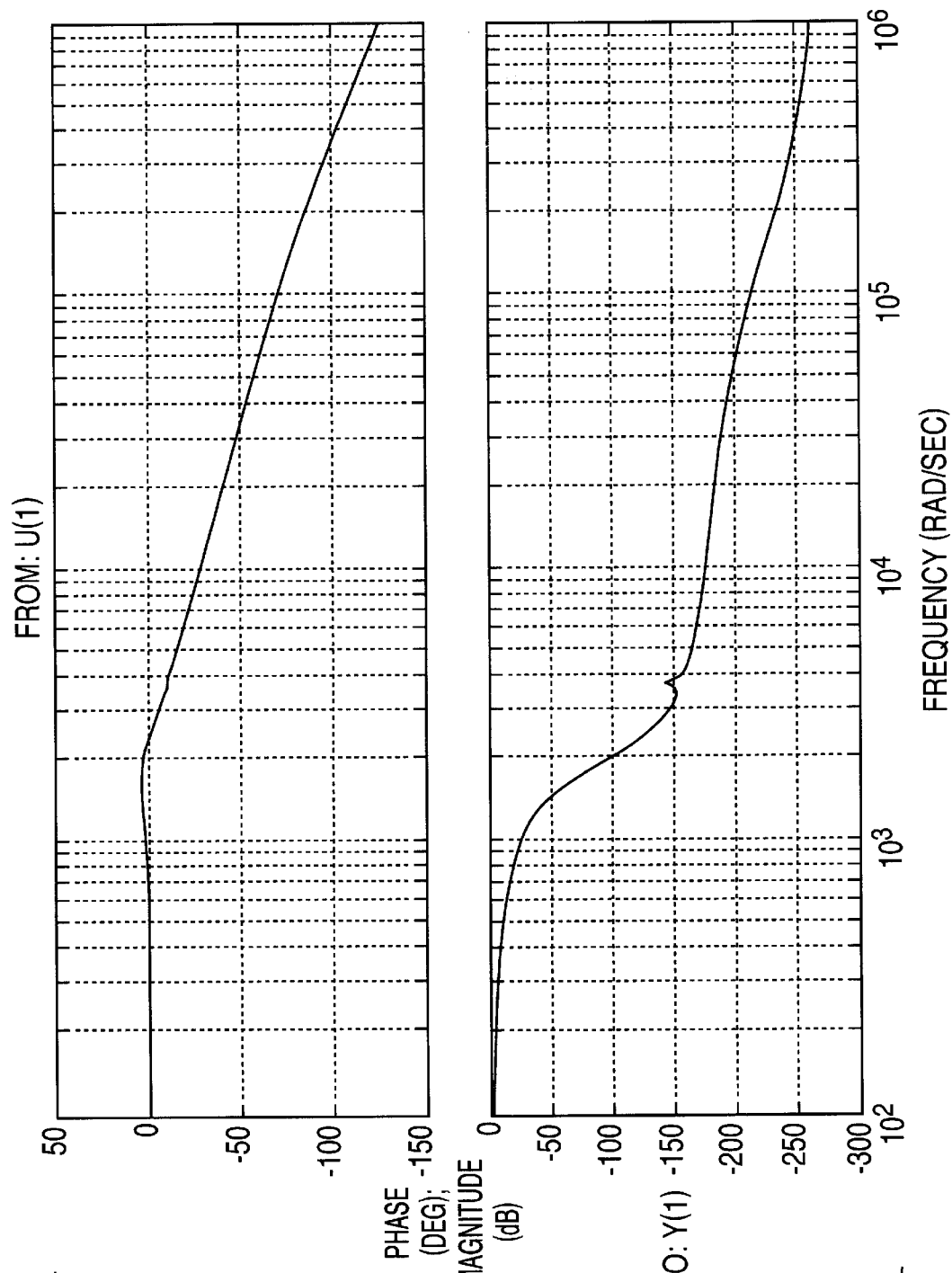
FIG. 17 is a graph of frequency response of notched closed lopp system.

FIG. 15 is a time domain response of the closed loop system with the notch filter inserted. While there is a substantial overshoot, it clearly provides a stable system with the required gain for a ⅟30 error. FIG. 16 is a frequency plot of the notch corrected open loop system, and FIG. 17 is such a plot for the closed loop system. It should be noted that the response of the closed loop system is very flat for low frequencies, with an amplitude of 0 dB, which means an overall gain of 1. This is, of course, the desired result, in that it implies that the system is faithfully following the input cylinder groove position.

Figure 18:
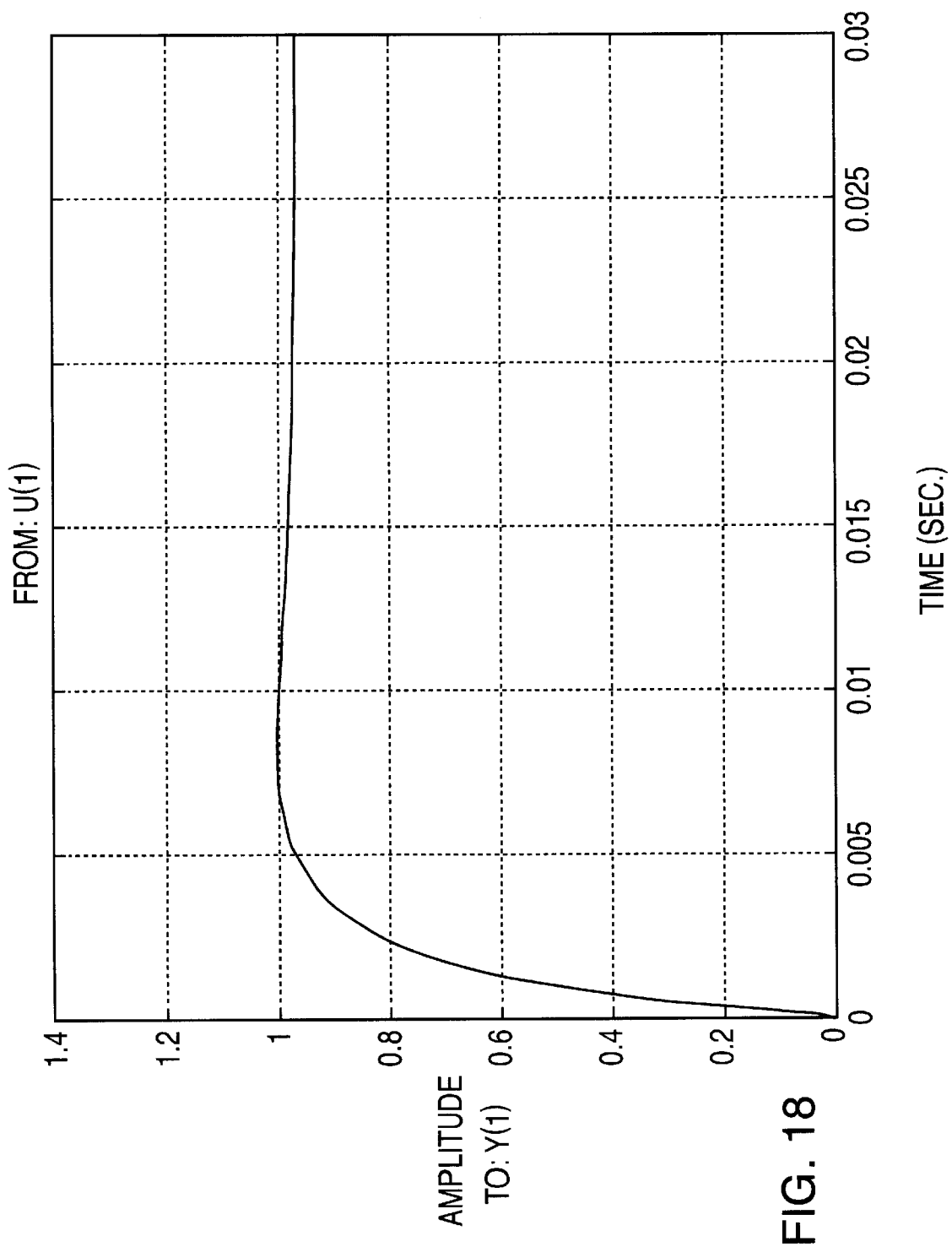
FIG. 18 is a graph of time step response of notched and compensated closed loop system.
Figure 19:
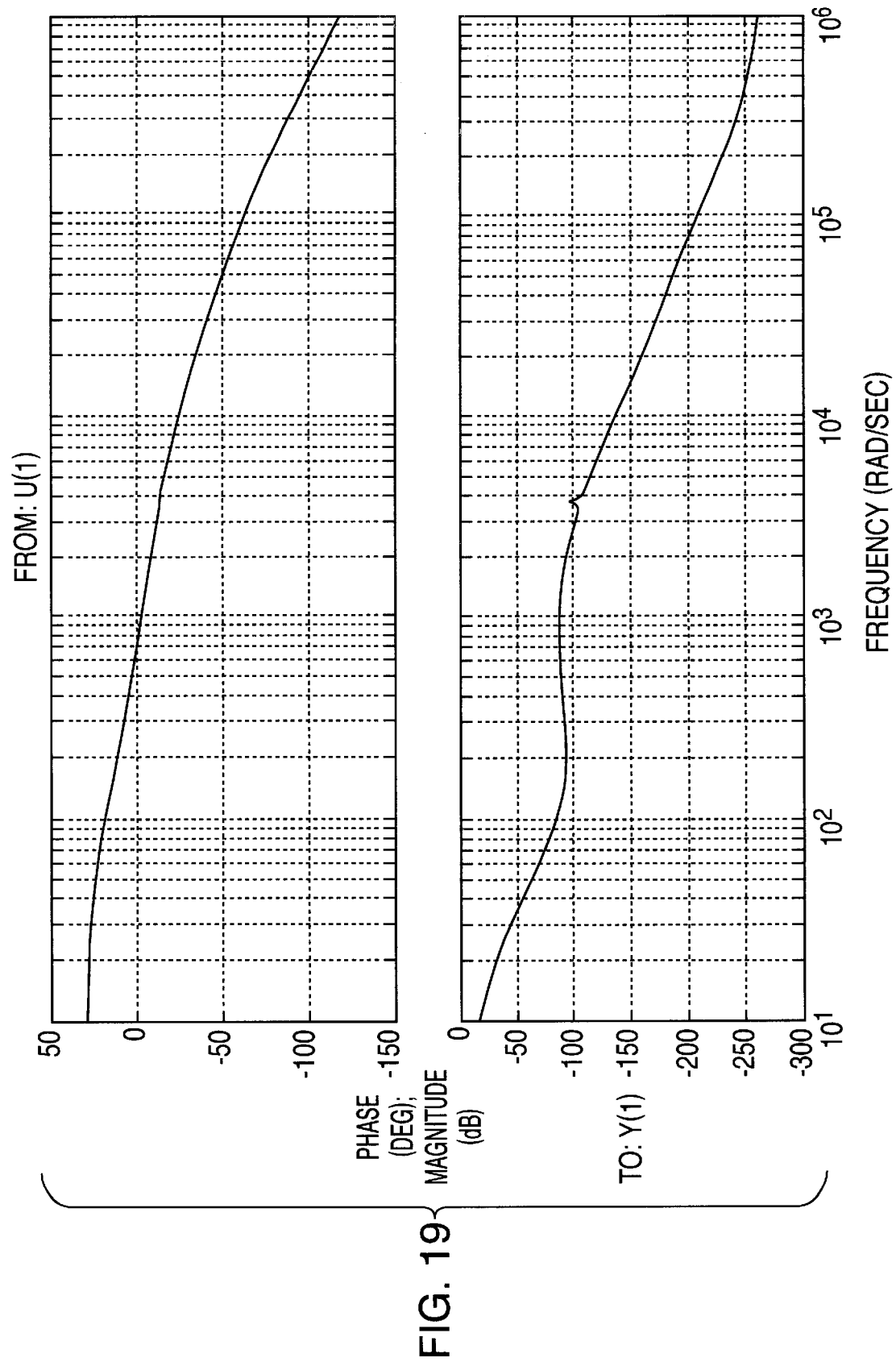
FIG. 19 is a graph of frequency response of notched and compensated open loop system.
Figure 20:
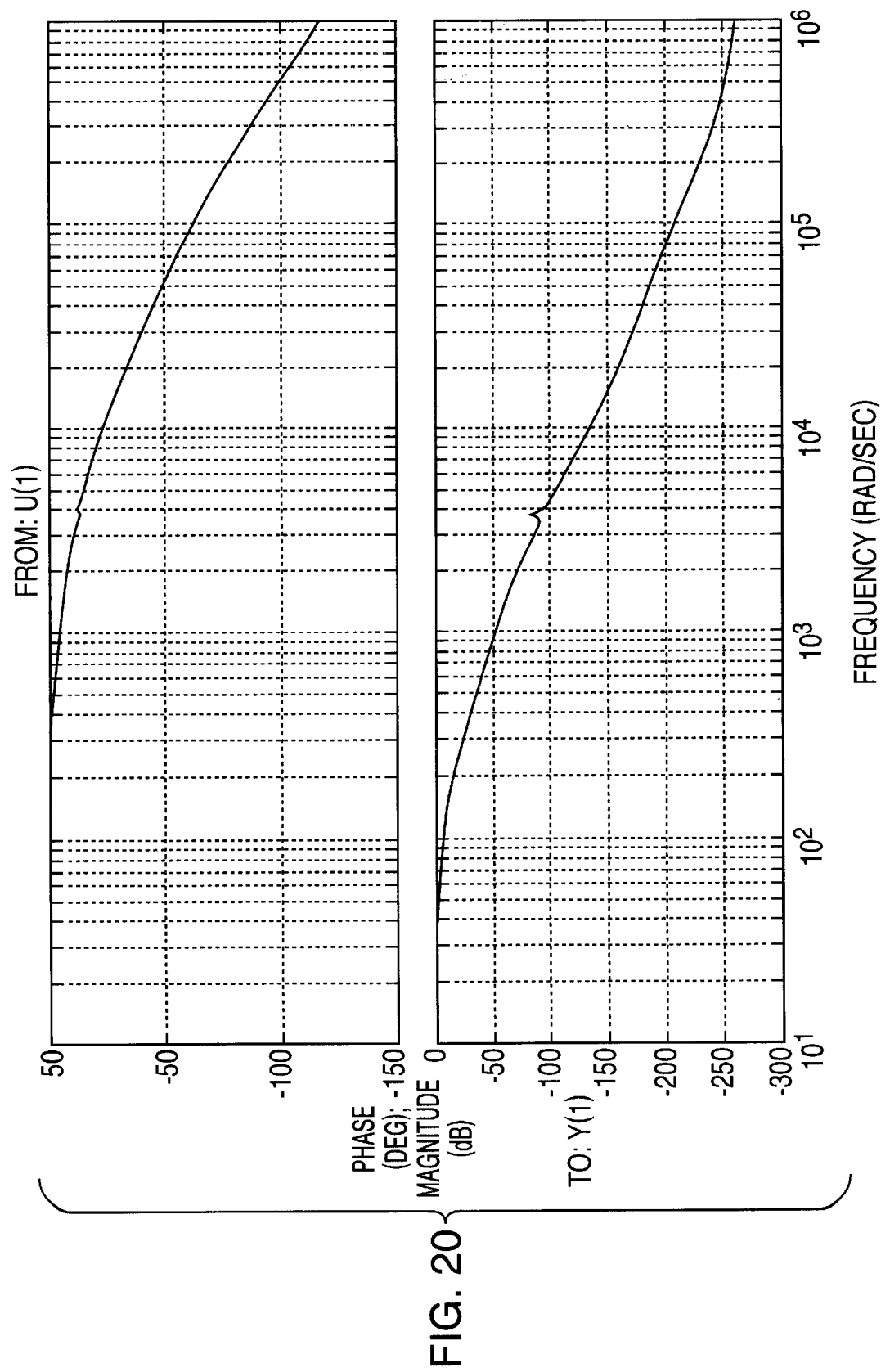
FIG. 20 is a graph of frequency response of notched and compensated closed loop system.

FIG. 18 is a step response of the closed loop system with the compensation network inserted in addition to the notch filter. Here it is seen that the response is very smooth, with hardly any overshoot. Finally, FIGS. 19 and 20 are open and closed-loop frequency response plots of the complete system, with notch filter and compensation networks in place.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A laser heterodyne interferometer based system for playing an audio recording physically stored in a groove formed in a cylinder, said system comprising:
   a. an optical system for generating a reference beam and a signal beam, comprising:
      i. a light source for generating a beam of light;
      ii. a first beam splitter for dividing said beam of light into said reference and signal beams;
      iii. a first transmission path along which said signal beam travels from said first beam splitter to said cylinder, whereby at the conclusion of said first transmission path said signal beam impinges upon and is reflected by said groove formed in said cylinder;
      iv. a second transmission path along which said reference beam travels;
      v. a frequency shifter positioned in said second transmission path, whereby said reference signal passes through said frequency shifter as it travels along said second transmission path; and
      vi. a third transmission path along which said signal beam travels after having been reflected by said impinged upon groove;
      vii. a detector for receiving said reference beam and said signal beam at the conclusion of said second and third transmission paths, respectively; and
      viii. means for outputting said audio recording to an audio speaker or audio recorder;
   b. an optics platform upon which said optical system is statically mounted; and
   c. an audio platform upon which said cylinder is movably mounted relative to said optics platform.

2. A laser heterodyne interferometer based system for playing an audio recording physically stored in a groove formed in a cylinder, said system comprising:
   a. an optical system for generating a reference beam and a signal beam, comprising:
      i. a light source for generating a beam of light;
      ii. a first beam splitter for dividing said beam of light into said reference and signal beams;
      iii. a first transmission path along which said reference beam travels beginning at said first beam splitter;
      iv. a second transmission path along which said signal beam travels beginning at said first beam splitter;
      v. a frequency shifter positioned in said second transmission path, whereby said signal beam passes through said frequency shifter;
      vi. means for transmitting said signal beam to impinge upon and be reflected by said groove;
      vii. a detector for receiving said reference and signal beams; and
      viii. means for outputting said audio recording to an audio speaker or audio recording device;
   b. an optics platform upon which said optical system is mounted; and
   c. an audio device platform upon which said cylinder is mounted in operative relation to said optics platform.

3. A laser heterodyne interferometer based system for playing an audio recording physically stored as a series of "peaks" and "valleys" in a groove formed in a cylinder when said groove is rotating at a predetermined speed, said system comprising:
   a. an optical system for generating a signal beam and a reference beam;
   b. means for directing said signal beam into said groove;
   c. means for heterodyning said reference and signal beams; and
   d. means for generating an acoustical signal recorded in said groove as it rotates.

4. The laser heterodyne interferometer based system according to claim 3, wherein said optical system for generating a signal beam and a reference beam comprises:
   a. a light source for generating a beam of light;
   b. first beam splitter for dividing said beam of light into said reference and signal beams;
   c. a first transmission path along which said reference beam travels beginning at said first beam splitter;
   d. a second transmission path along which said signal beam travels beginning at said first beam splitter; and
   e. a frequency shifter positioned in said second transmission path, whereby said signal beam passes through said frequency shifter.

5. The laser heterodyne interferometer based system according to claim 3, wherein said means for directing said signal beam into said groove comprises a collimator.

6. The laser heterodyne interferometer based system according to claim 3, wherein said means for directing said signal beam into said groove comprises first and second collimators.

7. The laser heterodyne interferometer based system according to claim 3, wherein said means for heterodyning said reference and signal beams comprises a detector.

8. The laser heterodyne interferometer based system according to claim 3, further comprising a system for tracking the position of said signal beam in said groove.

9. The laser heterodyne interferometer based system according to claim 8, wherein said tracking system comprises:
   a. first and second photodetectors;
   b. a galvonometer electrically interconnected to said first and second photodetectors; and
   c. means for communicating beam position to said galvonometer.

* * * * *